(12) United States Patent
Saito

(10) Patent No.: US 11,347,462 B2
(45) Date of Patent: May 31, 2022

(54) INFORMATION PROCESSOR, INFORMATION PROCESSING METHOD, AND PROGRAM

(71) Applicant: Sony Group Corporation, Tokyo (JP)

(72) Inventor: Mari Saito, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/321,824

(22) Filed: May 17, 2021

(65) Prior Publication Data

US 2021/0271441 A1    Sep. 2, 2021

Related U.S. Application Data

(63) Continuation of application No. 16/619,487, filed as application No. PCT/JP2018/009013 on Mar. 8, 2018, now Pat. No. 11,029,909.

(30) Foreign Application Priority Data

Jun. 12, 2017    (JP) .............................. JP2017-115264

(51) Int. Cl.
  *G06F 3/14*    (2006.01)
  *G06F 3/16*    (2006.01)
(52) U.S. Cl.
  CPC ............ *G06F 3/1423* (2013.01); *G06F 3/165* (2013.01); *G06T 2207/30196* (2013.01)
(58) Field of Classification Search
  None
  See application file for complete search history.

(56) References Cited

U.S. PATENT DOCUMENTS 8,880,648 B1 * 11/2014 Arora ................. H04N 21/4333
                                                                       709/218
2011/0307576 A1 * 12/2011 Miyoshi ................ H04L 65/605
                                                                       709/217

FOREIGN PATENT DOCUMENTS

CN    104488288 A    4/2015
CN    106375546 A    2/2017
(Continued)

OTHER PUBLICATIONS

International Search Report and Written Opinion dated Apr. 10, 2018 for PCT/JP2018/009013 filed on Mar. 8, 2018, 8 pages including English Translation of the International Search Report.

*Primary Examiner* — Christopher J Kohlman
(74) *Attorney, Agent, or Firm* — Xsensus, LLP

(57) ABSTRACT

[Object] To transmit information more flexibly and more reliably while allowing for user freedom.
[Solution] There is provided an information processor including an output control section that controls an output of presentation information that is performed by a plurality of output terminals. The output control section determines, on the basis of a moving path of a user, an allocation of the presentation information that is caused to be outputted by corresponding one of the plurality of output terminals. In addition, there is provided an information processing method that includes controlling, by a processor, an output of presentation information performed by a plurality of output terminals, and the controlling further includes determining an allocation of the presentation information that is caused to be outputted by corresponding one of the plurality of output terminals on the basis of a moving path of a user.

20 Claims, 10 Drawing Sheets

(56) References Cited

FOREIGN PATENT DOCUMENTS

| | | |
|---|---|---|
| JP | 2007-193292 A | 8/2007 |
| JP | 2012-519922 A | 8/2012 |
| JP | 2016-009214 A | 1/2016 |
| JP | 2016-177523 A | 10/2016 |
| JP | 2016-191657 A | 11/2016 |
| JP | 2016-212585 A | 12/2016 |
| WO | 2010/095264 A1 | 8/2010 |

* cited by examiner

INFORMATION PROCESSOR, INFORMATION PROCESSING METHOD, AND PROGRAM

This application is a continuation application of U.S. Ser. No. 16/619,487 filed on May 12, 2019 which is based on PCT filing PCT/JP2018/009013, filed Mar. 8, 2018, which claims priority to JP 2017-115264, filed Jun. 12, 2017, the entire contents of each are incorporated herein by reference.

TECHNICAL FIELD

The present disclosure relates to an information processor, an information processing method, and a program.

BACKGROUND ART

In recent years, with progress in information processing technology, various apparatuses that perform information presentation to a user have been in widespread use. In addition, a large number of techniques that increase convenience in information presentation performed by such an apparatus as described above have been developed. For example, PTL 1 discloses an information notification method in which presentation information is outputted as a voice output only in a case where a user is around an apparatus, thus reducing a possibility of the user failing to hear the presentation information.

CITATION LIST

Patent Literature

PTL 1: Japanese Unexamined Patent Application Publication No. 2016-208491

SUMMARY OF THE INVENTION

Problem to be Solved by the Invention

However, in a case of using an information notification method described in PTL 1, a user trying to receive presentation of information is constrained to stay around an apparatus. In addition, in the information notification method described in PTL 1, it is difficult to perform real-time information presentation to the user who is not around the apparatus.

Thus, the present disclosure proposes an information processor, an information processing method, and a program that are novel and improved and make it possible to transmit information more flexibly and more reliably while allowing for user freedom.

Means for Solving the Problem

According to the present disclosure, there is provided an information processor including an output control section that controls an output of presentation information that is performed by a plurality of output terminals. The output control section determines, on the basis of a moving path of a user, an allocation of the presentation information that is caused to be outputted by corresponding one of the plurality of output terminals.

In addition, according to the present disclosure, there is provided an information processing method that includes controlling, by a processor, an output of presentation information that is performed by a plurality of output terminals. The controlling further includes determining, on the basis of a moving path of a user, an allocation of the presentation information that is caused to be outputted by corresponding one of the plurality of output terminals.

In addition, according to the present disclosure, there is provided a program that causes a computer to function as an information processor. The information processor includes an output control section that controls an output of presentation information that is performed by a plurality of output terminals. The output control section determines, on the basis of a moving path of a user, an allocation of the presentation information that is caused to be outputted by corresponding one of the plurality of output terminals.

Effects of the Invention

As described above, according to the present disclosure, it is possible to transmit information more flexibly and more reliably while allowing for user freedom.

It is to be noted that the above-described effects are not necessarily limitative. In addition to or in place of the above effects, there may be achieved any of the effects described in the present specification or other effects that may be grasped from the present specification.

MODES FOR CARRYING OUT THE INVENTION

Figure 1:
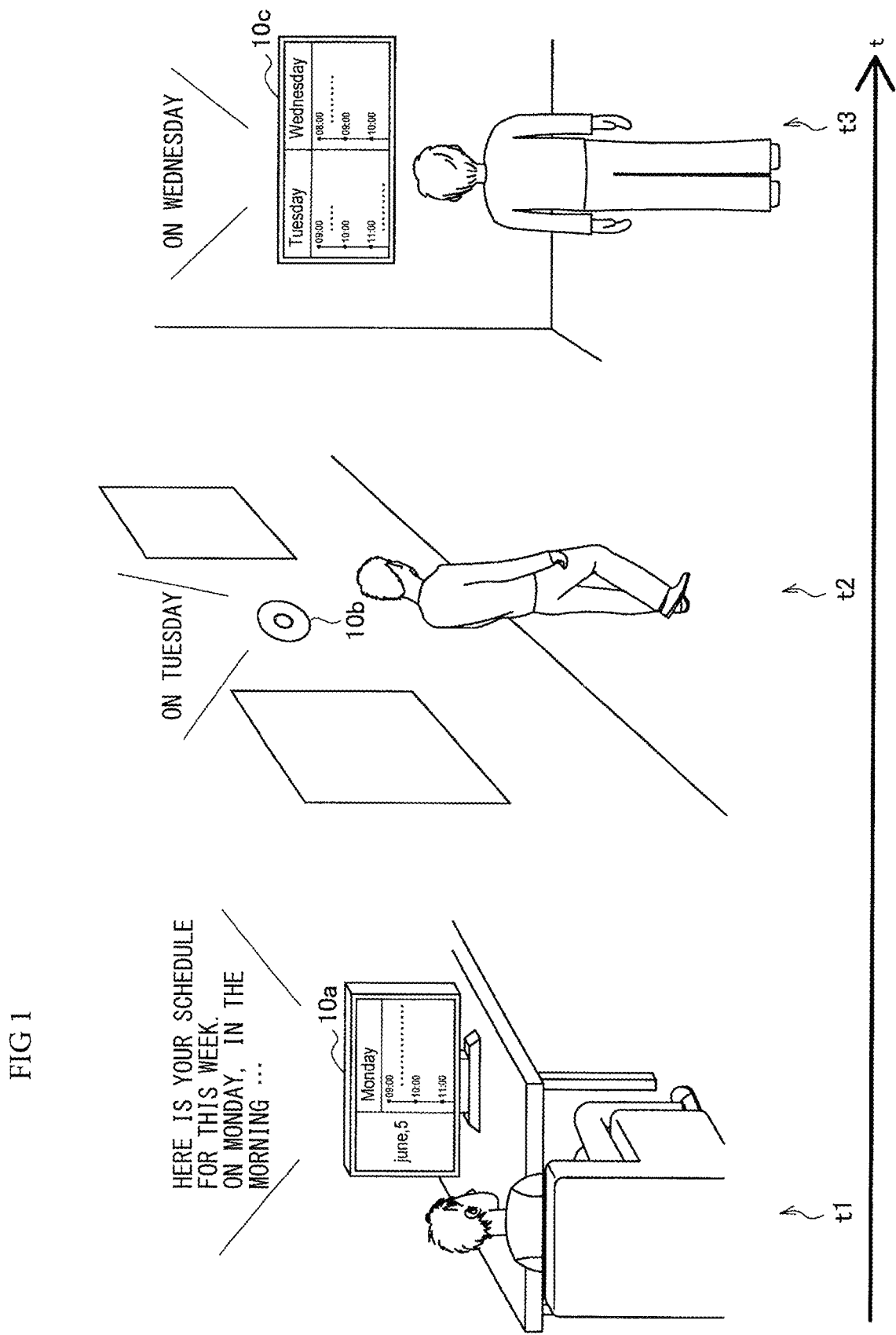
FIG. 1 is an explanatory diagram of output control of presentation information that is performed by an information processor according to an embodiment of the present disclosure.

In the following, preferred embodiments of the present disclosure are described in detail with reference to the attached drawings. It is to be noted that, in the present specification and drawings, repeated description is omitted for components substantially having the same functional configuration by assigning the same reference numerals.

It is to be noted that the description is given in the following order.
1. Embodiment
  1.1. Overview of Embodiment
  1.2. Example of System Configuration
  1.3. Example of Functional Configuration of Information Processing Terminal 10
  1.4. Example of Functional Configuration of Information Processor 20
  1.5. Application Example
  1.6. Flow of Control
2. Example of Hardware Configuration
3. Conclusion

1. EMBODIMENT

1.1. Overview of Embodiment

First, an overview of an embodiment of the present disclosure is described. As described above, in recent years, various types of apparatuses that perform information presentation to a user have been in widespread use. For example, such an apparatus as described above makes it possible to sequentially present to a user, a received message and news, a set alarm and schedule, etc., using a voice and an image.

However, in a case where an apparatus as described above is of a stationary type that is to be installed at a predetermined place, a user is able to receive information only in a case of being around the apparatus. Thus, in a case where information is outputted when a user is not around the apparatus, there is a possibility of causing a situation in which the user fails to see or hear important information.

Here, to prevent a situation as described above, for example, as in a technique described in PTL 1, it is assumed to detect a location of a user and perform information presentation only in a case where the user is around the apparatus.

However, in the technique described in PTL 1, even in a case where information to be presented has a high degree of importance or emergency, it is difficult to present the information to a user in real time in a case where the user is not around the apparatus. Thus, in a case of using the technique described in PTL 1, a case may occur where freshness of presentation information is lost, and an original value of the information is significantly deteriorated at a time when the user receives the information.

Meanwhile, in a case of giving priority to a real time property related to information presentation, for example, it is possible to transfer presentation information to a mobile terminal, etc. held by a user. However, for example, in a house, an office, an accommodation where a user stays during vacation, and the like, such a case is assumed where the user wants to avoid carrying a mobile terminal or where the user forgets to bring a mobile terminal. In addition, for example, at a public facility or a client's place, etc., there is also a case where use of a mobile terminal is not possible or a user is hesitant to use a mobile terminal.

Thus, in information presentation to a user, even in a case where the user does not carry a mobile terminal, a technique of performing real-time information presentation has been required at a point where the user is located.

A technical idea according to the present disclosure has been conceived by focusing on the above respect, and makes it possible to transmit information more flexibly and more reliably while allowing for user freedom. Thus, one of features of an information processor that achieves processing on the basis of an information processing method according to an embodiment of the present disclosure is to determine, on the basis of a moving path of a user, an allocation of presentation information that is caused to be outputted by a corresponding one of a plurality of output terminals. In other words, the information processor according to the present embodiment enables a plurality of output terminals that is present on a moving path of a user to output presentation information in a dispersed manner.

FIG. 1 is an explanatory diagram of output control of presentation information that is performed by an information processor according to the present embodiment. It is to be noted that in FIG. 1, the presentation information includes information regarding a user schedule, and an example of a case is described where a user moves in a house, from a living room, through a corridor, to a private room in order.

At this time, the information processor according to the present embodiment is able to determine an allocation of presentation information that is caused to be outputted by a plurality of output terminals that is present on the moving path of the user, namely, information processing terminals 10a to 10c, and enables the presentation information to be outputted in a dispersed manner on the basis of the allocation.

In addition, the information processor according to the present embodiment may determine an allocation of presentation information on the basis of an output characteristic of each of the information processing terminals 10a to 10c. The output characteristic as described above includes, for example, an information type that is outputtable by each of the information processing terminals 10a to 10c. More specifically, in a case where an information processing terminal 10 includes a display, etc. and is able to output visual information, the information processor is able to allocate to and cause the information processing terminal 10 to output a portion of presentation information as an image. In addition, in a case where the information processing terminal 10 includes a speaker, etc. and is able to output audio information, the information processor is able to allocate to and cause the information processing terminal 10 to output a portion of presentation information as a voice.

For example, at time t1, the information processing terminal 10a, which is disposed in the living room where the user is present, is a terminal able to output both visual information and audio information. At this time, the information processor allocates to and causes the information processing terminal 10a to output a portion of presentation information as an image and a voice. In a case of an example illustrated in FIG. 1, the information processing terminal 10a outputs, using an image and a voice, information regarding a schedule on Monday on the basis of the above allocation.

In addition, at time t2, the information processing terminal 10b, which is disposed in a corridor through which the user moves, is a terminal only able to output audio information. At this time, the information processor allocates to and causes the information processing terminal 10b to output a portion of presentation information as a voice. In a case of the example illustrated in FIG. 1, the information processing terminal 10b outputs, using a voice, information regarding a schedule on Tuesday on the basis of the above allocation.

In addition, at time t3, the information processing terminal 10c, which is disposed in the private room where the user is present, is a terminal able to output both visual information and audio information. At this time, the information processor allocates to and causes the information processing terminal 10c to output a portion of presentation information as an image and a voice. In a case of the example illustrated in FIG. 1, the information processing terminal 10c outputs, using an image and a voice, information regarding a schedule on Wednesday on the basis of the above allocation.

In addition, the information processor according to the present embodiment may determine an allocation to cause a portion of presentation information to be outputted by a plurality of information processing terminals 10 redundantly. For example, the information processor is able to perform an allocation to cause a portion of presentation information to be outputted as a voice or an image by a corresponding one of two different information processing terminals 10.

In a case of the example illustrated in FIG. 1, the information processor causes the information processing terminal 10b to output information regarding a schedule on Tuesday by a voice, while causing the information processing terminal 10c to output the information by an image. The above control performed by the information processor according to the present embodiment enables the user to reconfirm, as an image at time t3, the information regarding the schedule on Tuesday that is presented only using a voice at time t2. In this manner, in a case where the information processing terminal 10 that is able to output only one of audio information and visual information is present on the moving path, the information processor according to the present embodiment is able to perform an allocation to cause another information processing terminal 10 to compensate for a shortfall in information.

As described above, the information processor according to the present embodiment enables the plurality of information processing terminals 10 that is present on the moving path of the user to output presentation information in a dispersed manner. The above function of the information processor makes it possible to perform real-time information presentation in accordance with a moving path of a user even in a case where the user does not carry a mobile terminal, thus making it possible to achieve information presentation with higher convenience without restricting user behavior.

1.2. Example of System Configuration

Figure 2:
FIG. 2 is a block diagram that illustrates an example of a configuration of an information processing system according to the embodiment.

Next, an example of a configuration of an information processing system according to the present embodiment is described. FIG. 2 is a block diagram that illustrates an example of a configuration of the information processing system according to the present embodiment. Referring to FIG. 2, the information processing system according to the present embodiment includes the information processing terminal 10 and an information processor 20. It is to be noted that the information processing system according to the present embodiment may include a plurality of information processing terminals 10. In addition, the information processing terminal 10 and the information processor 20 are coupled to each other via a network 30 to allow for communication with each other.

Information Processing Terminal 10

The information processing terminal 10 according to the present embodiment has a function to output, on the basis of control performed by the information processor 20, a portion of allocated presentation information as audio information and visual information. It is possible to define the information processing terminal 10 according to the present embodiment as an apparatus that is able to output one or both of audio information and visual information.

For example, the information processing terminal 10 according to the present embodiment may be an acoustic apparatus that is able to output audio information, or may be a display apparatus that is able to output visual information. In addition, the information processing terminal 10 according to the present embodiment may be an apparatus that is able to output both audio information and visual information.

The information processing terminal 10 according to the present embodiment may be achieved as various types of equipment disposed indoors and outdoors. For example, the information processing terminal 10 may be a television apparatus, a computer, an audio apparatus, a home electric appliance, a digital signage apparatus, a vending machine, or the like.

In addition, the information processing terminal 10 according to the present embodiment has a function to collect various types of sensor information regarding a user and a surrounding environment. The above sensor information is used for output control of presentation information that is performed by the information processor 20.

Information Processor 20

The information processor 20 according to the present embodiment has a function to control an output of presentation information that is performed by the plurality of information processing terminals 10, on the basis of a moving path of a user, an output characteristic of each information processing terminal 10, and the like. More specifically, the information processor 20 according to the present embodiment is able to determine an allocation of presentation information that is caused to be outputted by the plurality of information processing terminals 10 that is present on the moving path of the user, and to cause the presentation information to be outputted in a dispersed manner on the basis of the allocation.

Network 30

The network 30 has a function to couple the information processing terminal 10 and the information processor 20 to each other. The network 30 may include a public network such as the Internet, a telephone network, and a satellite communication network, various types of LANs (Local Area Network) including Ethernet (registered trademark), WAN (Wide Area Network), etc. In addition, the network 30 may also include a dedicated line network such as an IP-VPN (Internet Protocol-Virtual Private Network). In addition, the network 30 may also include a wireless communication network such as Wi-Fi (registered trademark) and Bluetooth (registered trademark).

1.3. Example of Functional Configuration of Information Processing Terminal 10

Figure 3:
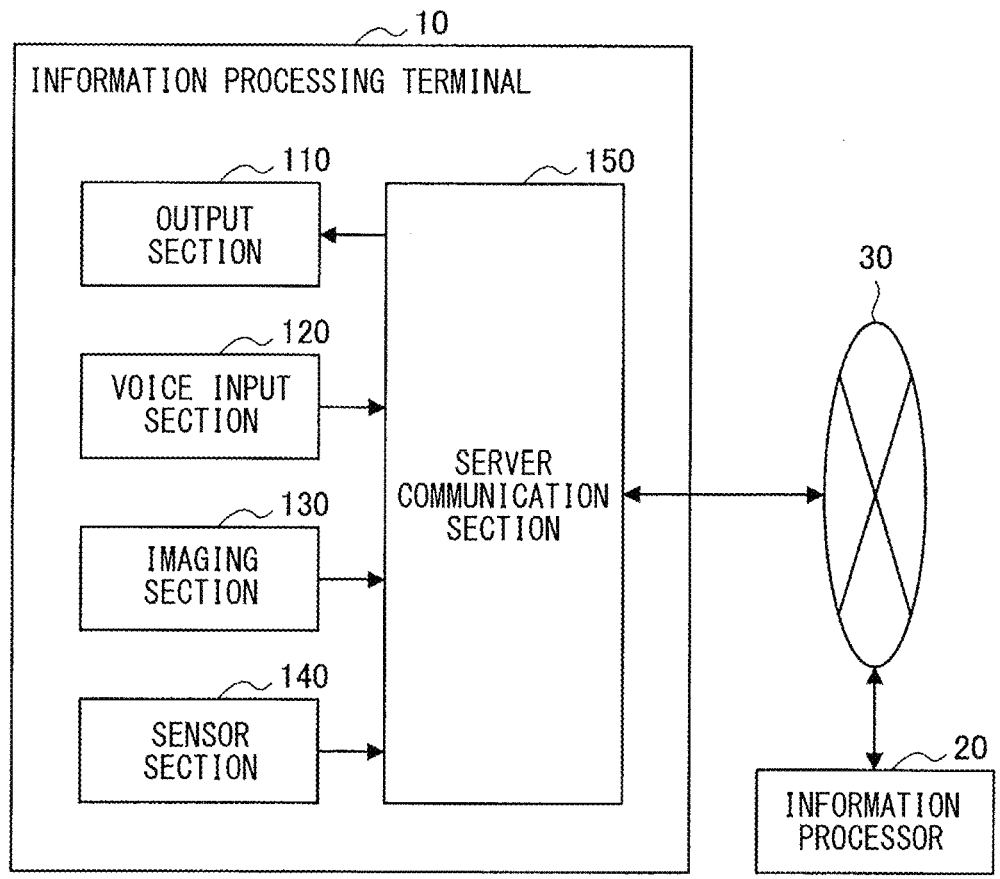
FIG. 3 is a block diagram that illustrates an example of a functional configuration of an information processing terminal according to the embodiment.

Next, an example of a functional configuration of the information processing terminal 10 according to the present embodiment is described. FIG. 3 is a block diagram that illustrates an example of a functional configuration of the information processing terminal 10 according to the present embodiment. Referring to FIG. 3, the information processing terminal 10 according to the present embodiment includes an output section 110, a voice input section 120, an imaging section 130, a sensor section 140, and a server communication section 150.

The output section 110 according to the present embodiment has a function to cause a portion of allocated presentation information to be outputted as audio information or visual information on the basis of control performed by the information processor 20. Therefore, the output section 110 according to the present embodiment includes a display device that is able to output an image, a speaker that is able to output a voice, and the like.

Voice Input Section 120

The voice input section 120 according to the present embodiment has a function to collect sound information such as background sound and speech by a user. The background sound and speech collected by the voice input section 120 is used for output control of presentation information that is performed by the information processor 20. The voice input section 120 according to the present embodiment includes a microphone with which to collect background sound and speech.

Imaging Section 130

The imaging section 130 according to the present embodiment has a function to capture an image that includes a user and a surrounding environment. The image captured by the imaging section 130 is used for output control of presentation information that is performed by the information processor 20. The imaging section 130 according to the present embodiment includes an imaging device that allows for capturing of an image. It is to be noted that the above image includes a moving image as well as a still image.

Sensor Section 140

The sensor section 140 according to the present embodiment has a function to collect various types of sensor information that indicates a state of a user and a surrounding environment. The sensor information collected by the sensor section 140 is used for output control of presentation information that is performed by the information processor 20. For example, the sensor section 140 according to the present embodiment includes various types of optical sensors including an infrared sensor, a thermal sensor, and the like.

Server Communication Section 150

The server communication section 150 according to the present embodiment has a function to perform information communication with the information processor 20 via the network 30. Specifically, the server communication section 150 transmits, to the information processor 20, sound information collected by the voice input section 120, image information captured by the imaging section 130, and sensor information collected by the sensor section 140. In addition, the server communication section 150 may transmit, to the information processor 20, information indicating an operational condition of the information processing terminal 10. In addition, the server communication section 150 receives, from the information processor 20, a control signal related to an output of presentation information and an artificial voice that is synthesized.

The example of a functional configuration of the information processing terminal 10 according to the present embodiment has been described above. It is to be noted that the above configuration described using FIG. 3 is merely an example, and the information processing terminal 10 according to the present embodiment is not limited to such an example. For example, the information processing terminal 10 according to the present embodiment need not necessarily include all of the voice input section 120, the imaging section 130, and the sensor section 140. In addition, the information processing terminal 10 according to the present embodiment may further include a configuration other than the configuration illustrated in FIG. 3. For example, the information processing terminal 10 may include an input section that receives an input operation by a user, a function control section that controls a function in accordance with a characteristic of the information processing terminal 10, and the like. It is possible to flexibly modify the functional configuration of the information processing terminal 10 according to the present embodiment in accordance with a specification and an operation.

1.4. Example of Functional Configuration of Information Processor 20

Figure 4:
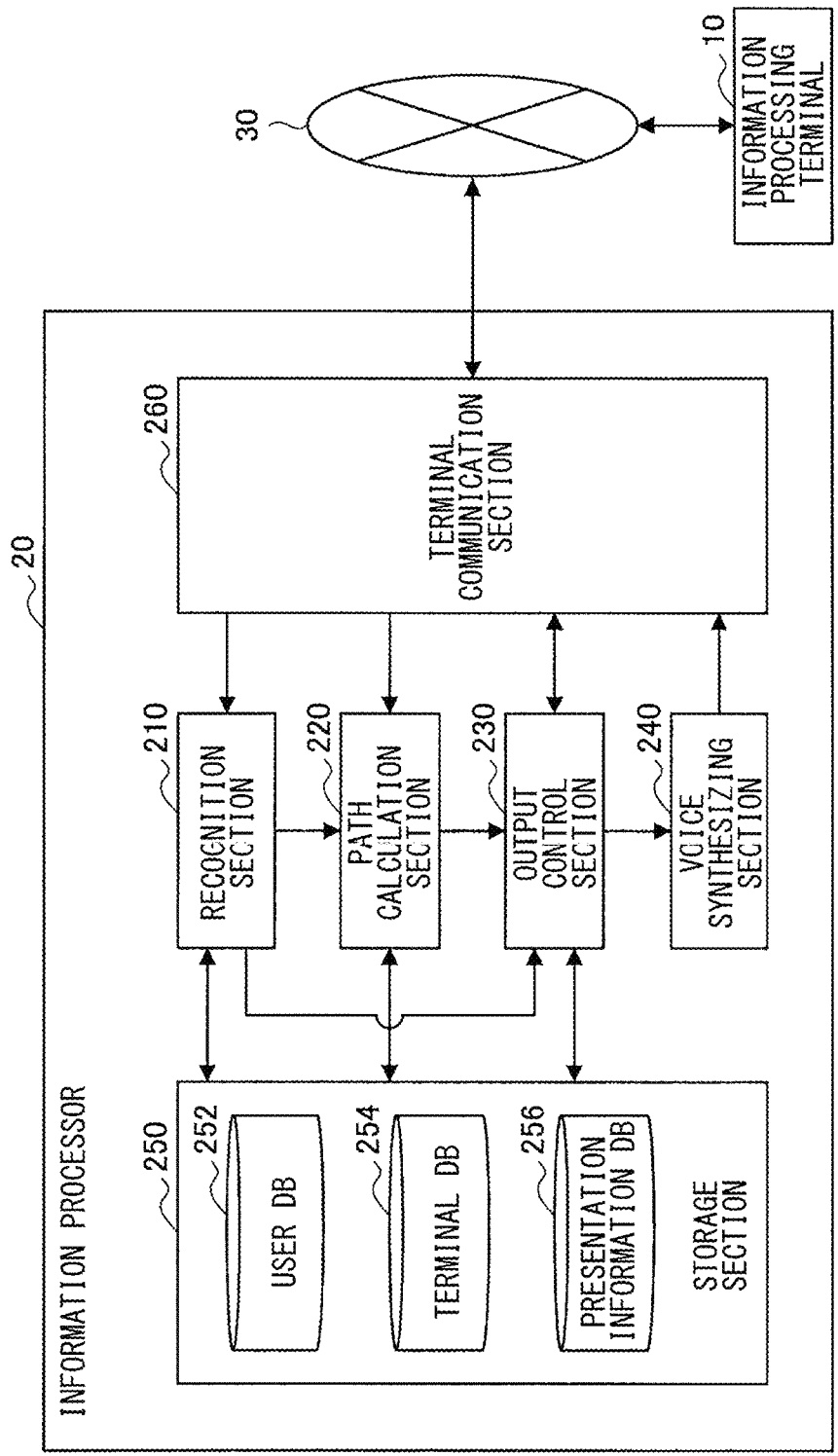
FIG. 4 is a block diagram that illustrates an example of a functional configuration of an information processor according to the embodiment.

Next, an example of a functional configuration of the information processor 20 according to the present embodiment is described. FIG. 4 is a block diagram that illustrates an example of a functional configuration of the information processor 20 according to the present embodiment. Referring to FIG. 4, the information processor 20 according to the present embodiment includes a recognition section 210, a path calculation section 220, an output control section 230, a voice synthesizing section 240, a storage section 250, and a terminal communication section 260. In addition, the storage section 250 includes a user DB 252, a terminal DB 254, and a presentation information DB 256.

Recognition Section 210

The recognition section 210 according to the present embodiment has a function to recognize a user and a state of a surrounding environment. For example, the recognition section 210 is able to recognize a user by comparing the user's speech and image that are collected by the information processing terminal 10 and the user's voice feature and image that are stored in the user DB 252 in advance with each other. The recognition section 210 according to the present embodiment may perform the user recognition as described above, using various types of recognition techniques that are widely used.

In addition, the recognition section 210 is able to recognize a state of the user on the basis of the user's speech, image, sensor information, and the like that are collected by the information processing terminal 10. The state described above includes various types of states related to a behavior and a feeling of the user. For example, the recognition section 210 is able to recognize a moving speed of a user on the basis of an image and sensor information that are collected by the information processing terminal 10. In addition, for example, the recognition section 210 may recognize, on the basis of the user's speech collected by the information processing terminal 10, that the user is having a conversation with another person.

In addition, for example, the recognition section 210 may recognize, on the basis of an image captured by the information processing terminal 10, that the user's eyes are not turned toward a display device included in the information processing terminal 10. In addition, for example, the recognition section 210 may recognize, on the basis of an image captured by the information processing terminal 10, that the user is excited.

In addition, the recognition section 210 is able to recognize a state of a surrounding environment on the basis of sound information, an image, sensor information, and the like that are collected by the information processing terminal 10. For example, the recognition section 210 may recognize a level of a surrounding noise on the basis of the sound information collected by the information processing terminal 10. In addition, for example, the recognition section 210 may recognize an amount of light, an orientation of a light source, etc. in surroundings on the basis of the sensor information collected by the information processing terminal 10.

Path Calculation Section 220

The path calculation section 220 according to the present embodiment has a function to calculate a moving path of a user. For example, the path calculation section 220 may estimate a moving path of a user on the basis of the user's speech, an image, sensor information, and the like that are collected by the plurality of information processing terminals 10. For example, the path calculation section 220 is able to estimate, on the basis that an approach of the user is detected by an infrared sensor included in the information processing terminal 10, a subsequent moving path of the user.

In addition, the path calculation section 220 may calculate a moving path on the basis of an explicit input by the user. For example, the path calculation section 220 may calculate the moving path on the basis of a destination inputted by the user.

In addition, the path calculation section 220 is also able to calculate a moving path on the basis of user information stored in the user DB 252. For example, the path calculation section 220 may calculate the moving path on the basis of information indicating that the user moves along the same path in a predetermined period of time in a daily life.

In addition, the path calculation section 220 may output a predetermined specific path as a moving path. For example, it is assumed that an evacuation path at a facility such as a hotel is not basically changed. In this case, the path calculation section 220 may output a predetermined evacuation path as a moving path.

Output Control Section 230

The output control section 230 according to the present embodiment has a function to control an output of presentation information that is performed by a plurality of information processing terminals 10. At this time, one of features of the output control section 230 is to determine, on the basis of the moving path calculated by the path calculation section 220, a plurality of information processing terminals 10 that is caused to output presentation information, and to perform an allocation of presentation information that is to be outputted by a corresponding one of the plurality of information processing terminals 10.

The above function of the output control section 230 according to the present embodiment enables a user to receive information presentation in real time at a destination of the movement without restriction on the behavior.

It is to be noted that the output control section 230 according to the present embodiment is able to flexibly control an allocation and an output of presentation information on the basis of various types of elements besides the moving path.

For example, the output control section 230 may control an allocation and an output of presentation information on the basis of an output characteristic of the information processing terminal 10. Here, the output characteristic described above includes an information type that is outputtable by each information processing terminal 10. As described using FIG. 1, the output control section 230 is able to allocate to and cause the information processing terminal 10 that is able to output audio information to output a portion of presentation information as a voice, and allocate to and cause the information processing terminal 10 that is able to output visual information to output a portion of presentation information as an image.

The above function of the output control section 230 according to the present embodiment allows for flexible allocation of presentation information in accordance with a modal of the information processing terminal 10 that is present on the moving path. In addition, as described above, the output control section 230 is able to secure integrity of presentation information by performing control on allocation to cause another information processing terminal 10 to compensate for a shortfall in audio information or visual information.

In addition, the output characteristic of the information processing terminal 10 includes information quantity that is outputtable by the information processing terminal 10. The output control section 230 according to the present embodiment is able to control an allocation and an output of presentation information on the basis of the above information quantity. For example, the output control section 230 may allocate more presentation information to the information processing terminal 10 that is able to output a larger information quantity.

For example, in a case where the information processing terminal 10 is able to output visual information, the output control section 230 is able to calculate the above information quantity on the basis of a screen size and resolution of a display section (such as a display device) that is included in the information processing terminal 10.

Figure 5:
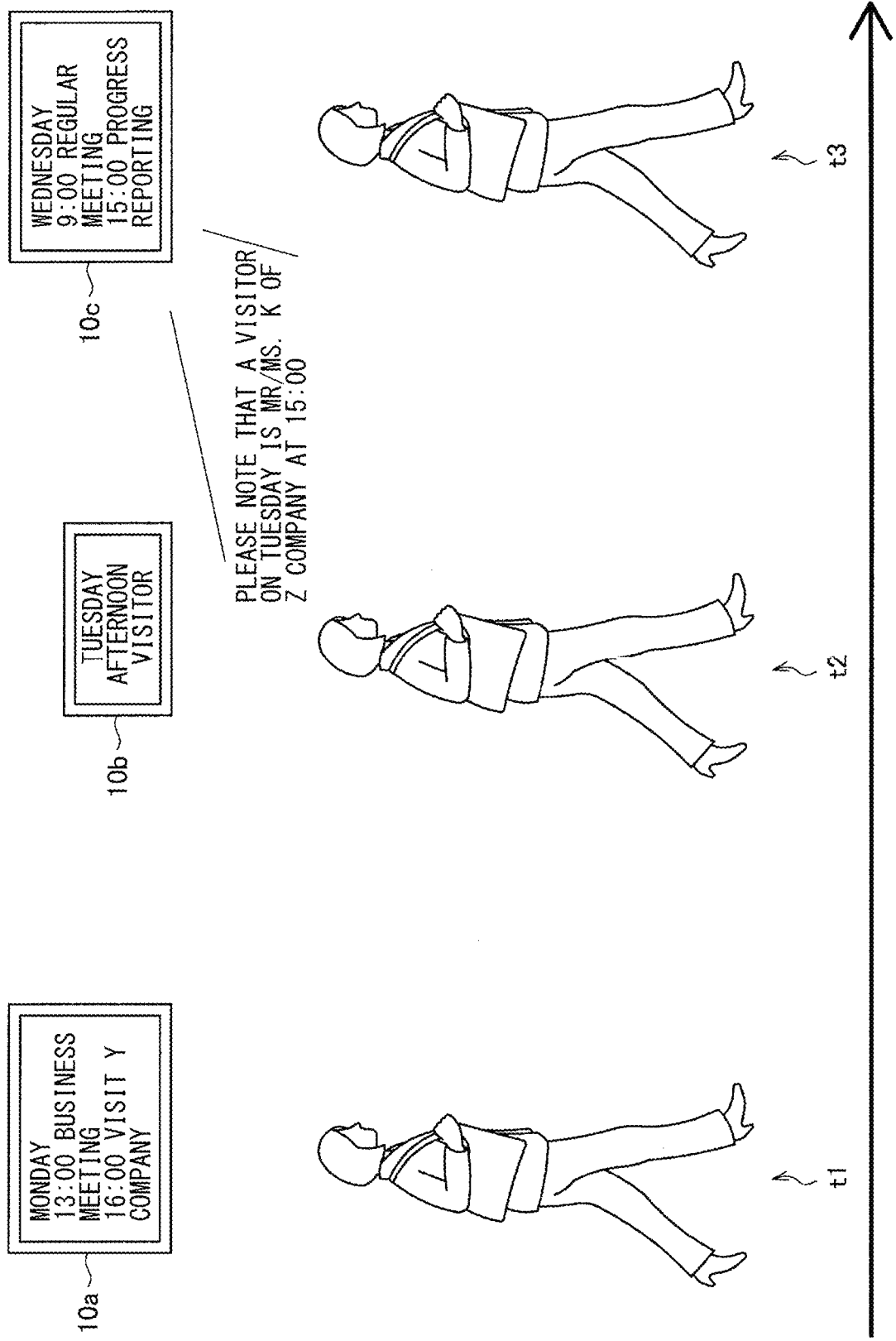
FIG. 5 is an explanatory diagram of an allocation of presentation information, which is performed on the basis of an information quantity of visual information that is outputtable by an information processing terminal according to the embodiment.

FIG. 5 is an explanatory diagram of an allocation of presentation information, which is performed on the basis of an information quantity of visual information that is outputtable by the information processing terminal 10 according to the present embodiment. FIG. 5 illustrates, on a moving path of a user, the information processing terminal 10a that is present at a point in time t1, the information processing terminal 10b that is present at a point in time t2, and the information processing terminal 10c that is present at a point in time t3.

At this time, the output control section 230 according to the present embodiment is able to control an allocation and an output of presentation information on the basis of a screen size of a display device included in each of the information processing terminals 10a to 10c. In a case of an example illustrated in FIG. 5, the output control section 230 allocates information regarding schedules on Monday, Tuesday, and Wednesday to the information processing terminals 10a to 10c, respectively, and causes the information processing terminal 10b having a smallest screen size, of these information processing terminals, to display a schedule having a coarser granularity than schedules displayed by the information processing terminal 10a and the information processing terminal 10c. In addition, in a case of the example illustrated in FIG. 5, the output control section 230 causes the information processing terminal 10c to output, as audio information, detailed information that is missing in an output by the information processing terminal 10b, thus compensating for the shortfall.

In this manner, the output control section 230 according to the present embodiment performs an appropriate control on an allocation and an output of presentation information in accordance with the information quantity of visual information that is outputtable by each information processing terminal 10, thus making it possible to achieve information presentation that is grasped by a user more easily.

In addition, in a case where the information processing terminal 10 is able to output audio information, the output control section 230 is able to calculate the above information quantity on the basis of a maximum volume that is outputtable by the information processing terminal 10. More specifically, the output control section 230 may estimate, on the basis of the maximum volume described above, a range in which audio information to be outputted by the information processing terminal 10 reaches a user, and control an allocation and an output of presentation information.

Figure 6:
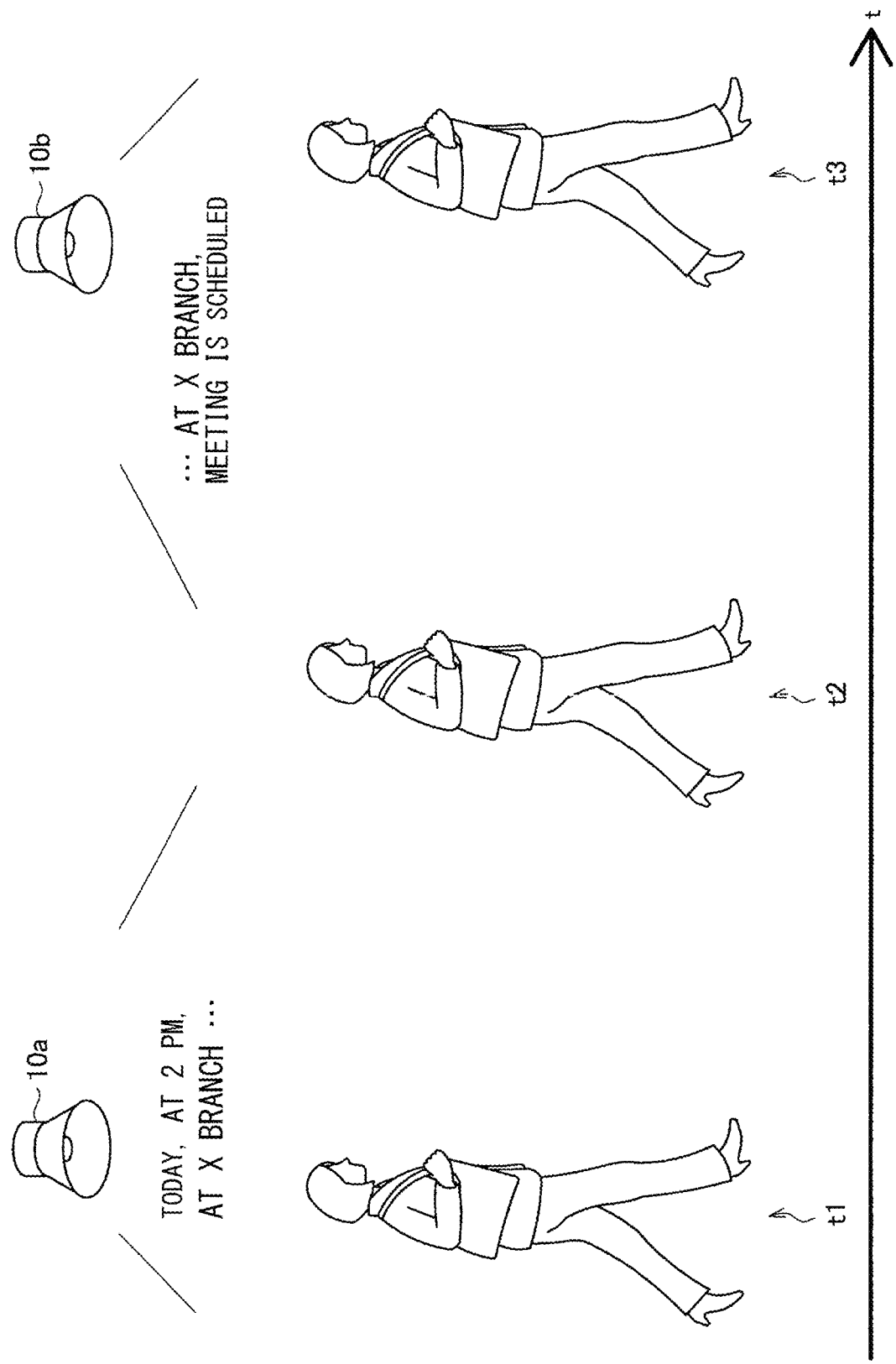
FIG. 6 is an explanatory diagram of an allocation of presentation information, which is performed on the basis of an information quantity of audio information that is outputtable by an information processing terminal according to the embodiment.

FIG. 6 is an explanatory diagram of an allocation of presentation information, which is performed on the basis of an information quantity of audio information that is outputtable by the information processing terminal 10 according to the present embodiment. FIG. 6 illustrates, on a moving path of a user, the information processing terminal 10a that is present at a point in time t1 and the information processing terminal 10b that is present at a point in time t2.

At this time, the output control section 230 according to the present embodiment is able to control an allocation and an output of presentation information on the basis of the maximum volume that is outputtable by each of the information processing terminals 10a and 10b. In a case of an example illustrated in FIG. 6, the output control section 230 allocates to and causes each of the information processing terminals 10a and 10b to output, respectively, a first half and a second half of presentation information that says, "Today, at 2 PM at X Branch, a meeting is scheduled".

More specifically, in a case where the information processing terminal 10a performs output at the maximum volume, the output control section 230 allocates to and causes the information processing terminal 10a to output "Today, at 2 PM, at X Branch", on the basis of a distance within which the presentation information is estimated to reach the user and time required for the output of the presentation information.

In addition, in a case where the information processing terminal 10b performs output at the maximum volume, the output control section 230 allocates to and causes the information processing terminal 10b to output "At X Branch, a meeting is scheduled" on the basis of a distance within which the presentation information is estimated to reach the user and time required for the output of the presentation information.

In addition, the output control section 230 performs an allocation to cause the information processing terminals 10a and 10b to output "X Branch" redundantly. The output control section 230 prevents an unnatural break in the presentation information by performing the redundant allocation as described above, thus making it possible to achieve more natural information presentation.

Furthermore, the output control section 230 is also able to perform control to allow a user to hear the presentation information at a constant volume by changing an output volume of each of the information processing terminals 10a and 10b. Specifically, the output control section 230 may perform control to gradually increase output volume in the voice output performed by the information processing terminal 10a, and may perform control to gradually decrease an output volume in the voice output performed by the information processing terminal 10b. The above control performed by the output control section 230 makes it possible to achieve more natural information presentation using a voice. It is to be noted that, for example, the output control section 230 is able to perform volume control on the basis of a moving speed of the user recognized by the recognition section 210.

In addition, the output characteristic of the information processing terminal 10 according to the present embodiment includes information regarding whether or not the information processing terminal 10 has a function, in addition to the information type and information quantity that are outputtable as described above. For example, in a case where the information processing terminal 10 has a function to enable control of directivity of an output direction, such as beamforming, the output control section 230 may control an allocation and an output of presentation information in consideration of the function. In addition, for example, in a case where the information processing terminal 10 has a function such as a screen division function, the output control section 230 is able to perform an allocation and an output control to utilize the function.

In addition, the output control section 230 according to the present embodiment is able to perform an allocation and an output control on the basis of a context related to an output of presentation information. For example, the above context includes a user state. The output control section 230 is able to control an allocation and an output of presentation information on the basis of the state of the user recognized by the recognition section 210.

For example, the output control section 230 may determine an allocation of presentation information on the basis of the moving speed of the user recognized by the recognition section 210 and perform an output control. In a case where the moving speed of the user is relatively high, the output control section 230 determines that it is difficult for the user to grasp visual information, and performs an allocation focusing on audio information, thus making it possible to reduce a possibility of the user failing to see the presentation information. In addition, the output control section 230 is able to perform an allocation in consideration of the number of and a disposing interval between the information processing terminals 10, to perform appropriate information presentation in accordance with the moving speed of the user.

In addition, for example, the output control section 230 may determine an allocation of presentation information on the basis of a user behavior that is recognized by the recognition section 210, and may perform an output control. The output control section 230 may perform an allocation focusing on visual information in a case where the user is having a conversation with another person, or may perform an allocation focusing on audio information in a case where the user is performing an operation on another device. In addition, the output control section 230 is also able to perform control such as performing supplementation with audio information or causing another information processing terminal 10 to output the same visual information again, on the basis of a recognition performed by the recognition section 210 that the user's eyes are not turned toward a display device included in the information processing terminal 10.

In addition, the context related to an output of presentation information includes a user characteristic. The output control section 230 is able to control an allocation and an output of presentation information on the basis of user information stored in the user DB 252.

For example, the output control section 230 may perform an allocation focusing on visual information in a case where the information stored in the user DB 252 indicates that the user prefers information presentation by visual information. In addition, for example, the output control section 230 may acquire, from the user DB 252, information regarding a time period during which the user is busy, and perform an allocation focusing on audio information on the basis of an assumption that the user is highly likely to be doing another operation.

In addition, the context related to an output of presentation information includes a state of a surrounding environment. The output control section 230 is able to control an allocation and an output of presentation information on the basis of a state of a surrounding environment of the user, which is recognized by the recognition section 210.

For example, in a case where a noise level recognized by the recognition section 210 is higher than a threshold value, the output control section 230 may perform an allocation of presentation information focusing on visual information. In addition, for example, in a case where visual recognition of visual information is determined to be difficult on the basis of a light source and a light amount that are recognized by the recognition section 210, the output control section 230 may perform an allocation of presentation information focusing on audio information.

In addition, the context related to an output of presentation information includes an operational condition of a terminal. The output control section 230 is able to control an allocation and an output of presentation information on the basis of information regarding an operational condition acquired from the information processing terminal 10.

For example, the output control section 230 may allocate visual information to the information processing terminal 10 that is outputting other sound information such as background music (BGM), or may allocate audio information to the information processing terminal 10 that is outputting other visual information such as a slide.

In addition, the context related to an output of presentation information includes a characteristic of presentation information. The output control section 230 is able to control an allocation and an output of the presentation information on the basis of the characteristic of the presentation information.

For example, in a case where the presentation information includes information that enables graphical presentation such as time-series data, the output control section 230 is able to allocate to and cause the information processing terminal 10 to output the information as visual information. In addition, for example, in a case where the presentation information includes an image and an explanation regarding the image, the output control section 230 is also able to allocate the image as visual information, and allocate the explanation as audio information.

The example of an allocation and an output control of presentation information, which are performed by the output control section 230 according to the present embodiment has been described above. The output control section 230 according to the present embodiment makes it possible to perform flexible output control in accordance with various types of elements.

Voice Synthesizing Section 240

The voice synthesizing section 240 according to the present embodiment has a function to synthesize, on the basis of control performed by the output control section 230, an artificial voice that is to be outputted by the information processing terminal 10.

Storage Section 250

The storage section 250 according to the present embodiment includes the user DB 252, the terminal DB 254, and the presentation information DB 256.

User DB 252

The user DB 252 according to the present embodiment stores information regarding a user. For example, the user DB 252 stores a user's age, a sex, a facial image, a voice feature, and the like. In addition, the user DB 252 stores various types of information that indicates a user's preference and characteristic.

Terminal DB 254

The terminal DB 254 according to the present embodiment stores information regarding the information processing terminal 10. For example, the terminal DB 254 stores information such as position information, an outputtable information type, image size, resolution, a maximum output volume, a function, and the like regarding the terminal DB 254. The above information stored in the terminal DB 254 is used for a selection, an allocation, and an output control of the information processing terminal 10, which are performed by the output control section 230.

Presentation Information DB 256

The presentation information DB 256 according to the present embodiment stores presentation information outputted by the information processing terminal 10. For example, the presentation information stored in the presentation information DB 256 may be a message, news, an advertisement, a schedule, a response to an inquiry from a user, and the like. In addition, the presentation information according to the present embodiment need not necessarily be stored in the presentation information DB 256. For example, the presentation information according to the present embodiment may be acquired from another apparatus via the network 30, or may be dynamically generated by the output control section 230.

Terminal Communication Section 260

The terminal communication section 260 according to the present embodiment has a function to perform information communication with a plurality of information processing terminals 10 via the network 30. Specifically, the terminal communication section 260 receives, from the information processing terminal 10, sound information, image information, sensor information, information indicating an operational condition, and the like. In addition, the terminal communication section 260 transmits, to the information processing terminal 10, a control signal generated by the output control section 230 and related to an output of presentation information as well as an artificial voice synthesized by the voice synthesizing section 240.

The example of the functional configuration of the information processor 20 according to the present embodiment has been described above. It is to be noted that the configuration described above using FIG. 4 is a mere example, and the functional configuration of the information processor 20 according to the present embodiment is not limited to such an example. For example, the information processor 20 need not necessarily include all of the configurations illustrated in FIG. 4. It is also possible for the recognition section 210, the path calculation section 220, the voice synthesizing section 240, and the storage section 250 to be included in another apparatus different from the information processor 20. It is possible to flexibly modify the functional configuration of the information processor 20 according to the present embodiment in accordance with a specification and an operation.

1.5. Application Example

Next, an application example of the information processor 20 according to the present embodiment is described. In the above description, as an example, a case has been described where the information processor 20 according to the present embodiment controls an output performed by the information processing terminal 10 that is mainly provided indoors such as in a house and in an office. However, the information processor 20 according to the present embodiment is not limited to the above example, and is able to control an output performed by the information processing terminal 10 that is installed at various types of indoor facilities.

For example, the information processor 20 according to the present embodiment may control an output of presentation information that is performed by the information processing terminal 10 installed at an art facility such as an art museum. In recent years, at an art facility, there has been a case where explanation of pieces of work, etc. is provided using a headset, etc. The information processor 20 according to the present embodiment enables a user to enjoy explanation, etc. of pieces of work in accordance with the moving path even without using a headset as described above.

Figure 7:
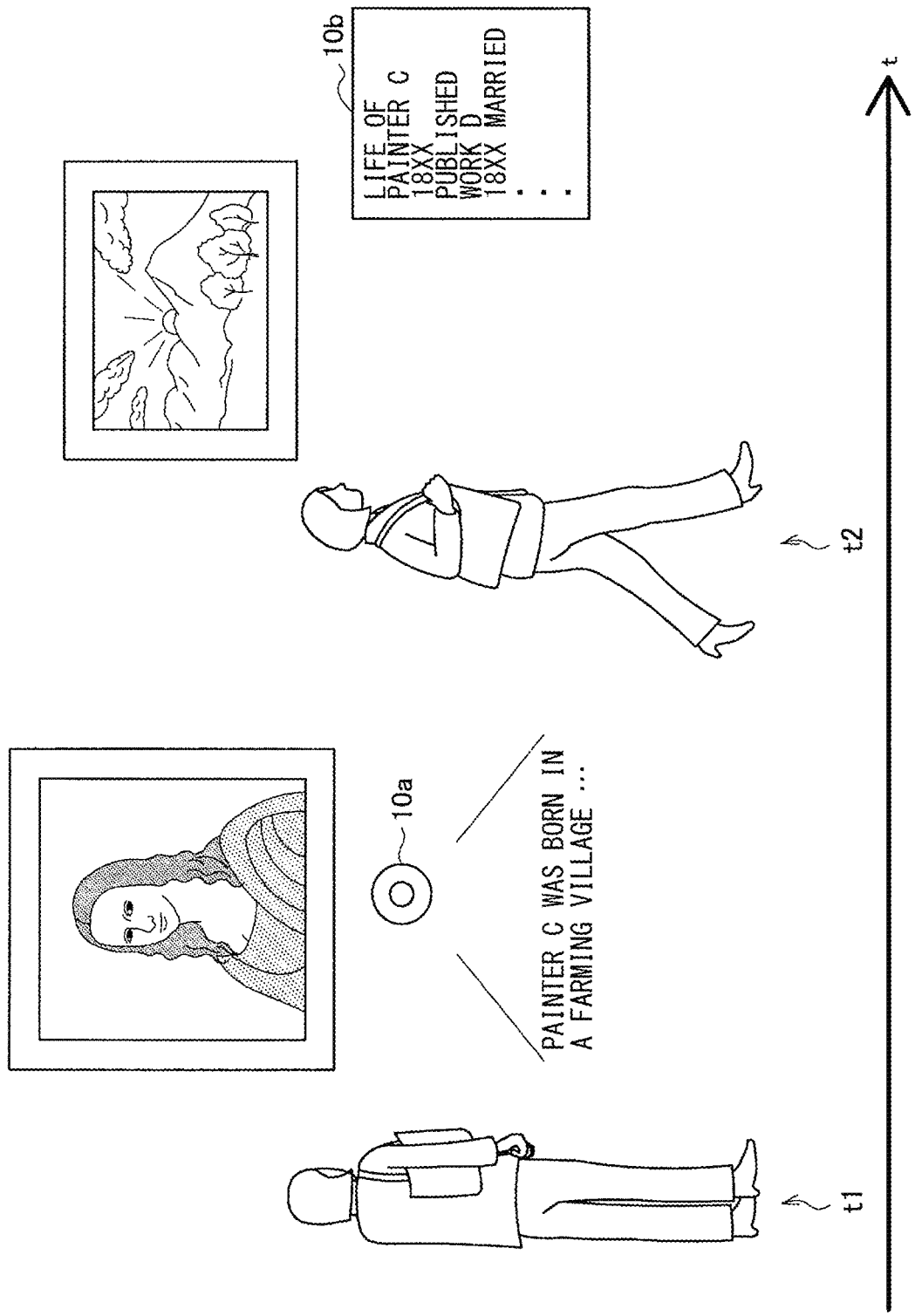
FIG. 7 is an explanatory diagram of an example of control performed by an information processor according to the embodiment on an information processing terminal 10 that is installed at an art facility.

FIG. 7 is an explanatory diagram of an example of control performed by the information processor 20 according to the present embodiment on the information processing terminal 10 that is installed at an art facility. FIG. 7 illustrates, on a moving path of a user, the information processing terminal 10a that is present at a point in time t1 and the information processing terminal 10b that is present at a point in time t2.

At this time, the output control section 230 according to the present embodiment is able to perform, on the basis of a moving speed and a state of a user, an allocation of presentation information that is caused to be outputted by the information processing terminals 10a and 10b. For example, it is assumed that time spent on appreciating pieces of work at an art facility varies relatively largely between individual users. Thus, the output control section 230 enables the information processing terminal 10a located nearby to continuously output presentation information during a period in which the user stops moving to appreciate a piece of work, and enables the information processing terminal 10b disposed at a destination of movement to output remaining presentation information in a case where the user starts moving again. In this manner, the output control section 230 according to the present embodiment is able to dynamically change the allocation of the presentation information on the basis of the context related to the presentation information.

In addition, in a case where a user is concentrated on appreciating a piece of work, the output control section 230 may also perform control to allow the user to receive presentation information while appreciating the piece of work by allocating the presentation information as audio information.

In this manner, the information processor 20 according to the present embodiment makes it possible to perform appropriate information presentation to a user without using a headset or a mobile terminal, thus enabling the user to easily obtain useful information while enjoying art.

It is to be noted that, in a case where there is a plurality of users at the same time, the output control section 230 is able to perform an output control corresponding to each of the users by utilizing a function such as beamforming and screen division.

In addition, the information processor 20 according to the present embodiment also makes it possible to control an output of presentation information that is performed by the information processing terminal 10 disposed outdoors besides the information processing terminal 10 installed indoors.

Figure 8:
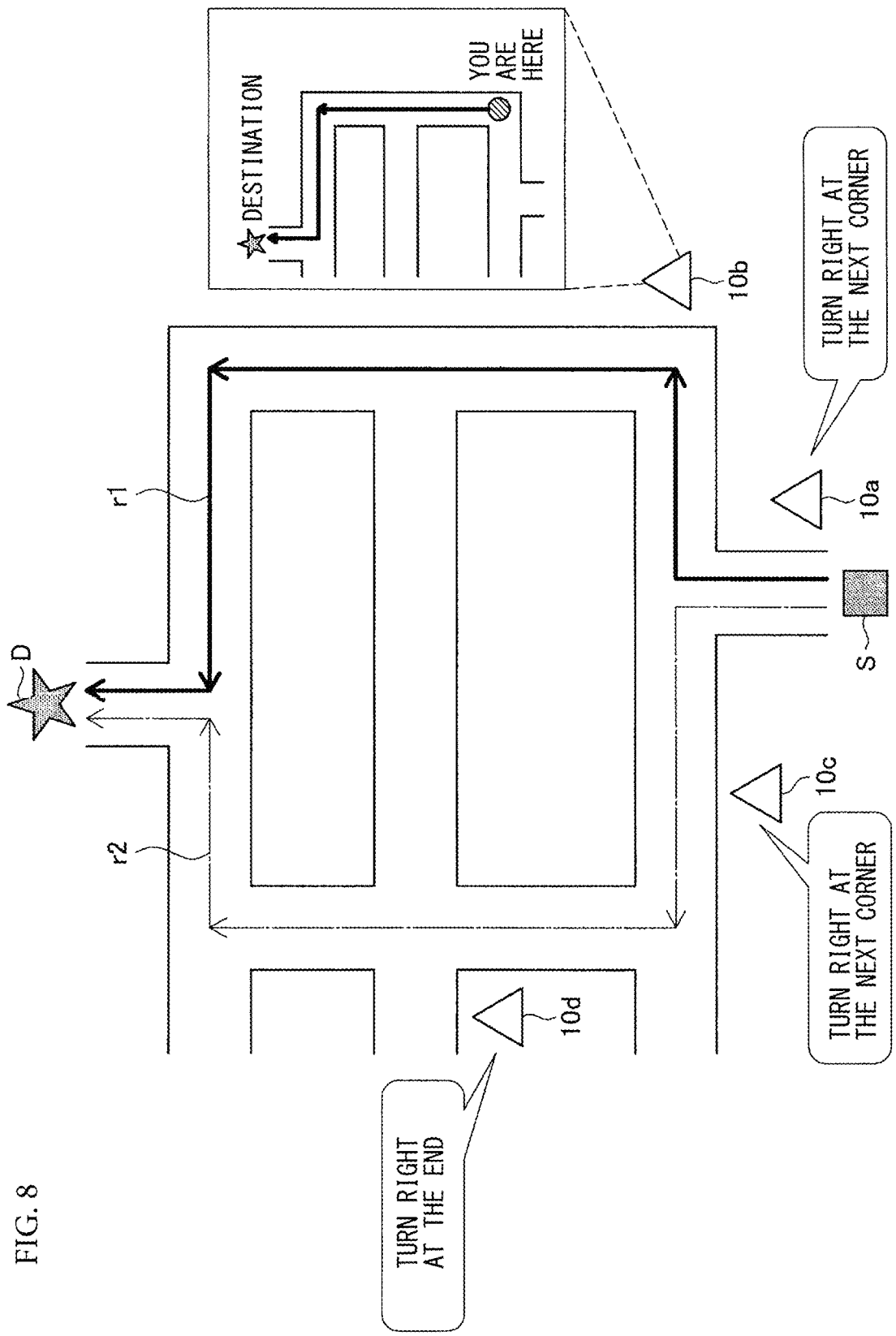
FIG. 8 is an explanatory diagram of an example of control performed by an information processor according to the embodiment on an information processing terminal 10 that is installed outdoors.

FIG. 8 is an explanatory diagram of an example of control that is performed by the information processor 20 according to the present embodiment on the information processing terminal 10 provided outdoors. FIG. 8 illustrates a town road map and a plurality of information processing terminals 10a to 10d that is disposed along a street.

For example, the information processor 20 according to the present embodiment enables the information processing terminal 10 to output navigation information to a destination D. For example, in a case where a user is at a start point S of navigation, the path calculation section 220 according to the present embodiment calculates a moving path r1 to the destination D. At this time, the output control section 230, on the basis of the moving path r1 calculated by the path calculation section 220, allocates to and causes the information processing terminals 10a and 10b to output navigation information, i.e., presentation information. In this manner, the output control section 230 according to the present embodiment may determine, on the basis of the calculated moving path, the information processing terminal 10a that is caused to output the presentation information.

In a case of an example illustrated in FIG. 8, the output control section 230 allocates to and causes the information processing terminal 10a to output audio information prompting a right turn, and allocates to and causes the information processing terminal 10b to output visual information indicating a specific path to the destination D.

Meanwhile, such cases are assumed where a user does not follow the navigation and where a user fails to hear the outputted presentation information. For example, in a case where a user fails to hear audio information outputted by the information processing terminal 10a and turns left from the start point S, the path calculation section 220 calculates a moving path r2 on the basis of an image and sensor information that are collected by the information processing terminals 10a and 10c.

At this time, the output control section 230 is able to reallocate the presentation information to the information processing terminals 10c and 10d on the basis of the newly calculated moving path r2. In the example illustrated in FIG. 8, the output control section 230 allocates to and causes each of the information processing terminals 10c and 10d to output audio information prompting a right turn. In this manner, the output control section 230 according to the present embodiment is able to dynamically change the information processing terminal 10 caused to output presentation information or an allocation, on the basis of the moving path calculated by the path calculation section 220.

The example of a case has been described above where the information processor 20 according to the present embodiment controls an output of presentation information that is performed by the information processing terminal 10 installed outdoors. The information processor 20 according to the present embodiment makes it possible to effectively utilize a resource such as a digital signage apparatus and a vending machine that are disposed in town and to perform useful information presentation to a user in real time.

It is to be noted that the information processor 20 according to the present embodiment may perform an output control related to the information processing terminal 10 that is disposed not only in town but also in a private property such as a company. In the private property as described above, in a general case, map information is not disclosed to the outside. However, the information processor 20 according to the present embodiment also makes it possible to perform navigation as described above for a visitor without disclosing the map information.

1.6. Flow of Control

Figure 9:
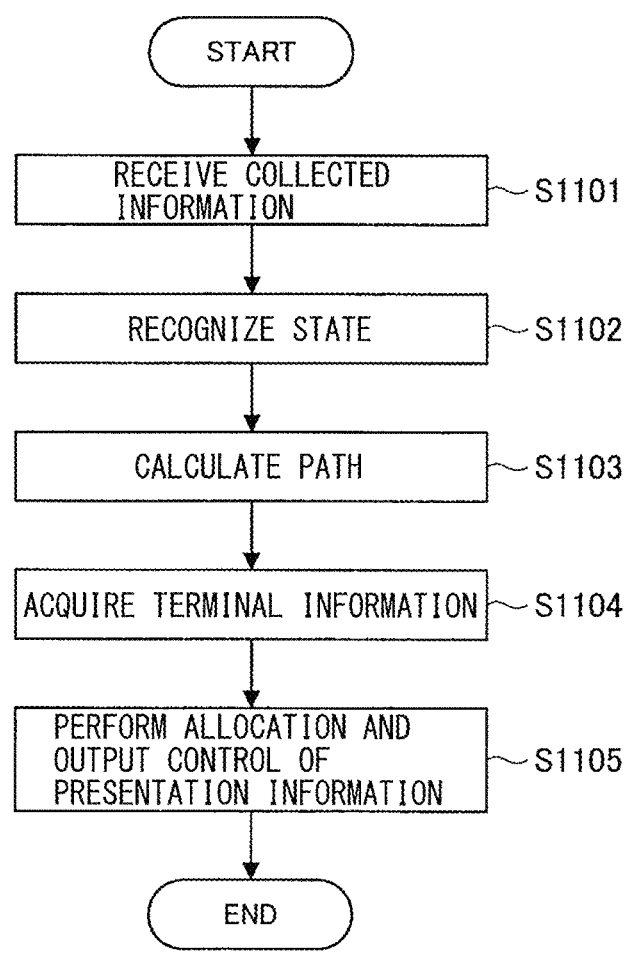
FIG. 9 is a flowchart that illustrates a flow of control performed by an information processor according to the embodiment.

Next, a flow of control performed by the information processor 20 according to the present embodiment is described. FIG. 9 is a flowchart that illustrates a flow of control performed by the information processor 20 according to the present embodiment.

Referring to FIG. 9, first, the terminal communication section 260 in the information processor 20 receives collected information from a plurality of information processing terminals 10 (S1101). Here, the collected information described above includes sound information, image information, sensor information, information indicating an operational condition, and the like.

Next, the recognition section 210 performs recognition related to a user and a surrounding environment on the basis of the collected information received in Step S1101 (S1102). It is to be noted that the recognition processing in Step S1102 is continuously performed in parallel with subsequent processing.

Next, the path calculation section 220 calculates a moving path of the user on the basis of the collected information, etc. received in Step S1101 (S1103).

Next, on the basis of the moving path calculated in Step S1103, the output control section 230 acquires, from the terminal DB 254, terminal information regarding the plurality of information processing terminals 10 that is present on the moving path (S1104).

Subsequently, the output control section 230 performs an allocation and an output control of presentation information on the basis of the terminal information acquired in Step S1104 and various states recognized in Step S1102 (1105).

Figure 10:
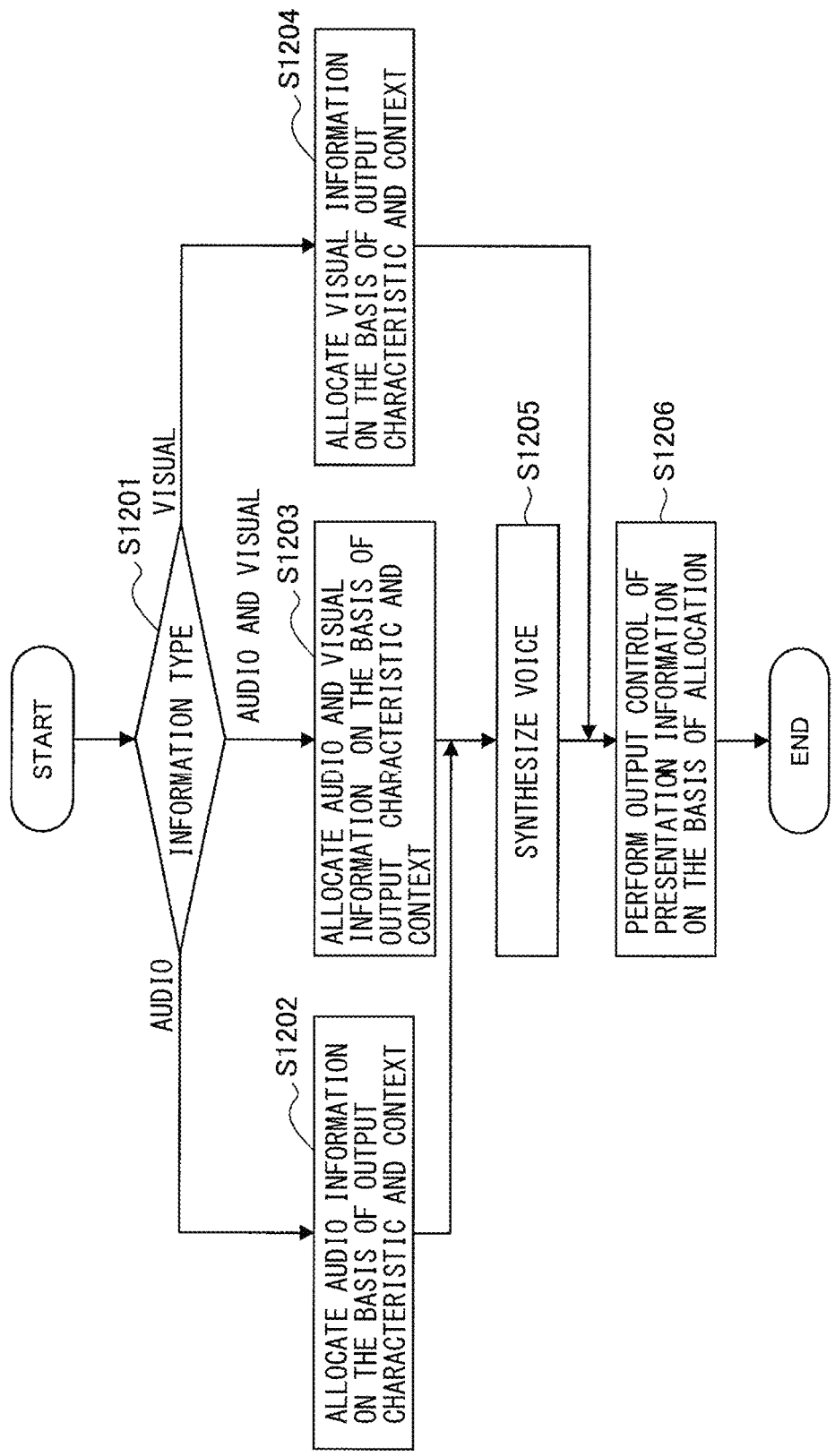
FIG. 10 is a flowchart that illustrates a flow of an allocation and an output control of presentation information, which are performed by an information processor 20 according to the embodiment.

The flow of control performed by the information processor 20 according to the present embodiment has been described above. Subsequently, a flow of an allocation and an output control of presentation information that is performed by the information processor 20 according to the present embodiment is described in detail. FIG. 10 is a flowchart that illustrates a flow of an allocation and an output control of presentation information that is performed by the information processor 20 according to the present embodiment.

Referring to FIG. 10, the output control section 230 determines, on the basis of the terminal information acquired in Step S1104 illustrated in FIG. 9, an information type that is outputtable by the information processing terminal 10 (S1201).

Here, in a case where the information type that is outputtable by the information processing terminal 10 is only audio information (S1201: Audio), the output control section 230 allocates the audio information to the information processing terminal 10 on the basis of output characteristic of the information processing terminal 10 and a context related to an output of the presentation information (S1202).

In addition, in a case where the information processing terminal 10 is able to output both audio information and visual information (S1201: Audio and Visual), the output control section 230 allocates audio information and visual information to the information processing terminal 10 on the basis of the output characteristic of the information processing terminal 10 and the context related to the output of the presentation information (S1203).

In addition, in a case where the information type that is outputtable by the information processing terminal 10 is only visual information (S1201: Visual), the output control section 230 allocates visual information to the information processing terminal 10 on the basis of the output characteristic of the information processing terminal 10 and the context related to the output of the presentation information (S1204).

In a case of allocating audio information in Steps S1202 and S1203, the output control section 230 causes the voice synthesizing section 240 to synthesize an artificial voice that corresponds to the audio information (S1205).

Subsequently, the output control section 230 controls the output of the presentation information that is performed by the plurality of information processing terminals 10, on the basis of the allocation determined in Steps S1202 to S1204 (S1206). It is to be noted that, as described above, the output control section 230 according to the present embodiment makes it possible to dynamically change an allocation on the basis of the collected information that is collected by the information processing terminal 10.

2. EXAMPLE OF HARDWARE CONFIGURATION

Figure 11:
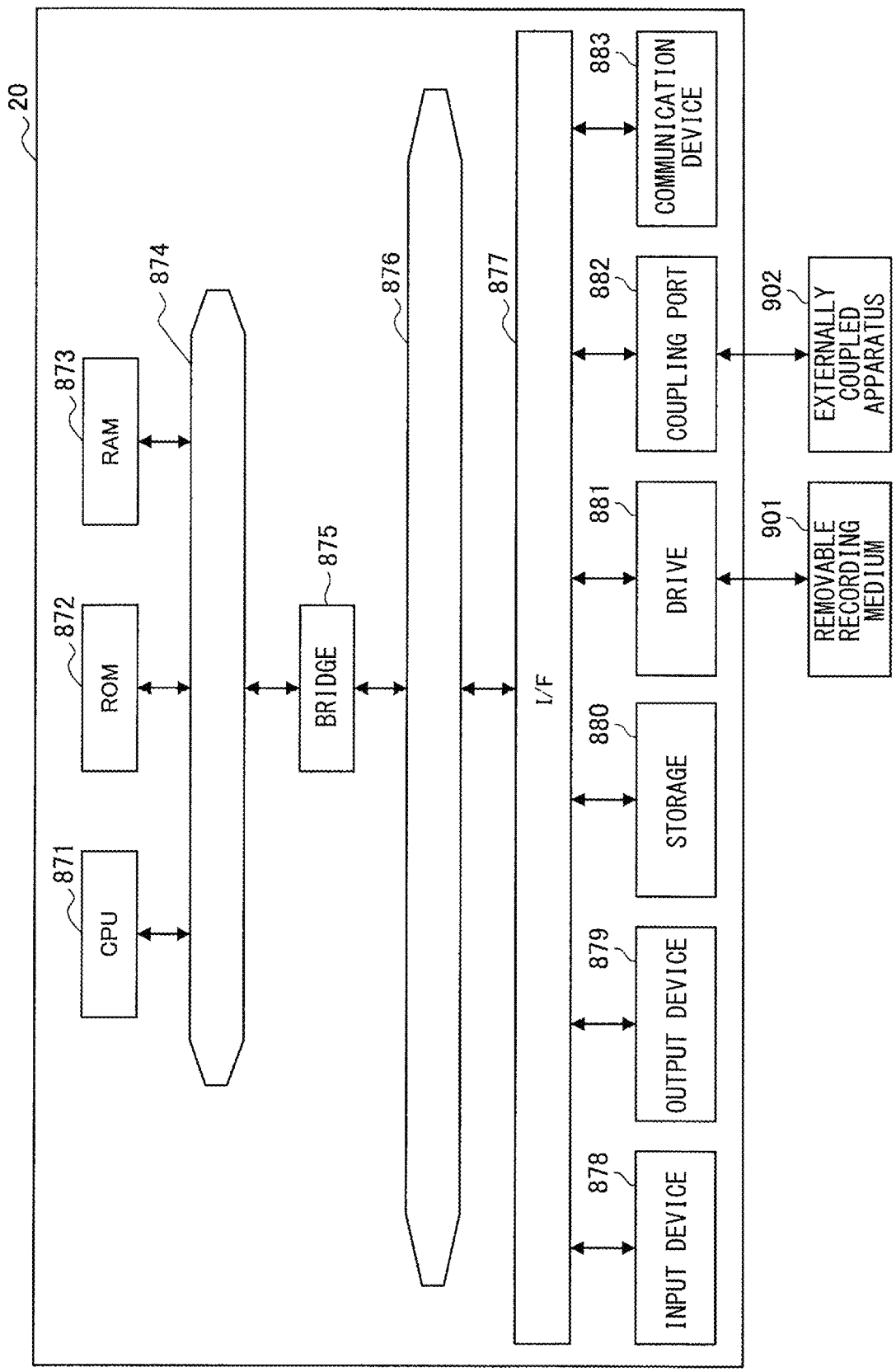
FIG. 11 is a diagram that illustrates an example of a hardware configuration according to the present disclosure.

Next, an example of a hardware configuration that is common to the information processing terminal 10 and the information processor 20 according to an embodiment of the present disclosure is described. FIG. 11 is a block diagram that illustrates an example of a hardware configuration of the information processing terminal 10 and the information processor 20 according to an embodiment of the present disclosure. Referring to FIG. 11, the information processing terminal 10 and the information processor 20 each include, for example, a CPU 871, ROM 872, RAM 873, a host bus 874, a bridge 875, an external bus 876, an interface 877, an input device 878, an output device 879, storage 880, a drive 881, a coupling port 882, and a communication device 883. It is to be noted that the hardware configuration illustrated here is an example, and a portion of components may be omitted. In addition, a component other than the components illustrated here may be further included.

CPU 871

For example, the CPU 871 functions as an arithmetic processor or controller, and controls an overall operation or a portion of the operation of each component on the basis of various programs recorded in the ROM 872, the RAM 873, the storage 880, or a removable recording medium 901.

ROM 872 and RAM 873

The ROM 872 is a means to store a program that is to be read by the CPU 871, data used for an operation, and the like. For example, the RAM 873 stores, temporality or permanently, a program that is to be read by the CPU 871 and various parameters, etc. that vary appropriately when executing the program. (Host Bus 874, Bridge 875, External Bus 876, and Interface 877)

For example, the CPU 871, the ROM 872, and the RAM 873 are coupled to one another via the host bus 874 that enables high-speed data transmission. Meanwhile, for example, the host bus 874 is coupled, via the bridge 875, to the external bus 876 of which data transmission speed is relatively low. In addition, the external bus 876 is coupled to various components via the interface 877.

Input Device 878

For the input device 878, for example, a mouse, a keyboard, a touch panel, a button, a switch, a lever, and the like are used. Furthermore, as the input device 878, there is a case where a remote controller (hereinafter, a remote) that enables transmission of a control signal using infrared rays or another radio wave may be used. In addition, the input device 878 includes a voice input device such as a microphone.

Output Device 879

The output device 879 is a device that enables notifying a user of acquired information visually or aurally, using, for example, a display device such as a CRT (Cathode Ray Tube), a LCD (liquid crystal display), or an organic EL (electroluminescence display), an audio output device such as a speaker and a headphone, a printer, a mobile phone, a facsimile, or the like. In addition, the output device 879 according to the present disclosure includes various vibration devices that enable outputting tactile stimulation.

Storage 880

The storage 880 is a device that stores various data. For example, as the storage 880, a magnetic storage device such as a hard disk drive (HDD), a semiconductor storage device, an optical storage device, a magneto-optical storage device, or the like is used.

Drive 881

For example, the drive 881 is a device that reads information recorded in the removable recording medium 901 such as a magnetic disk, an optical disk, a magneto-optical disk or a semiconductor memory, or writes information into the removable recording medium 901.

Removable Recording Medium 901

For example, the removable recording medium 901 is a DVD (digital versatile disc) medium, a Blu-ray (registered trademark) medium, an HD DVD (high-definition digital versatile disc) medium, various semiconductor storage medium, or the like. It goes without saying that the removable recording medium 901 may be an IC (integrated circuit) card mounted with a non-contact IC chip, an electronic apparatus, or the like, for example.

Coupling Port 882

For example, the coupling port 882 is a port to which an externally coupled apparatus 902, such as a USB (Universal Serial Bus) port, an IEEE 1394 port, an SCSI (Small Computer System Interface), an RS-232C port, or an optical audio terminal is coupled.

Externally Coupled Apparatus 902

For example, the externally coupled apparatus 902 is a printer, a portable audio player, a digital camera, a digital video camera, an IC recorder, or the like.

Communication Device 883

The communication device 883 is a communication device allowing for coupling to a network, and includes, for example, a communication card for a wired or wireless local area network (LAN), Bluetooth (registered trademark), or WUSB (Wireless USB), an router for optical communication, an ADSL (Asymmetric Digital Subscriber Line) router, or modems for various types of communication.

3. CONCLUSION

As described above, one of features of the information processor 20 according to an embodiment of the present disclosure is to determine, on the basis of a moving path of a user, an allocation of presentation information that is caused to be outputted by a plurality of information processing terminals 10 that is present on the moving path. In addition, the information processor 20 according to an embodiment of the present disclosure enables a plurality of information processing terminals 10 to output presentation information in a dispersed manner on the basis of the above allocation. This configuration makes it possible to transmit information more flexibly and more reliably while allowing for user freedom.

Although the description has been given in detail hereinabove of the preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

Further, the effects described herein are merely illustrative or exemplary, and are not limitative. That is, the technique according to the present disclosure may achieve, in addition to or in place of the above effects, other effects that are obvious to those skilled in the art from the description of the present specification.

In addition, each step involved in processing performed by the information processor 20 in the present specification need not necessarily be processed in time series in accordance with an order described in a flowchart. For example, each step involved in the processing performed by the information processor 20 may be processed in an order different from the order described in the flowchart or may be processed in parallel.

It is to be noted that the following configuration also belongs to the technical scope of the present disclosure.

(1)

An information processor including an output control section that controls an output of presentation information, the output being performed by a plurality of output terminals, the output control section determining an allocation of the presentation information on a basis of a moving path of a user, the presentation information being caused to be outputted by corresponding one of the plurality of output terminals.

(2)

The information processor according to (1), in which the output control section determines the allocation on a basis of an output characteristic of each of the output terminals.

(3)

The information processor according to (2), in which the output characteristic includes an information type that is outputtable by each of the output terminals, and the output control section determines the allocation on a basis of the information type.

(4)

The information processor according to (3), in which the information type includes at least audio information and visual information, and the output control section allocates, as a voice, at least a portion of the presentation information to the corresponding one of the output terminals configured to output the audio information, and allocates, as an image, at least a portion of the presentation information to the corresponding one of the output terminals configured to output the visual information.

(5)

The information processor according to any one of (2) to (4), in which the output characteristic includes an outputtable information quantity that is outputtable by each of the output terminals, and the output control section determines the allocation on a basis of the outputtable information quantity.

(6)

The information processor according to (5), in which the output control section calculates the outputtable information quantity on a basis of a size of a display section included in each of the output terminals.

(7)

The information processor according to (5) or (6), in which the output control section calculates the outputtable information quantity on a basis of a maximum volume that is outputtable by each of the output terminals.

(8)

The information processor according to any one of (1) to (7), in which the output control section determines the allocation on a basis of a context related to the output of the presentation information.

(9)

The information processor according to (8), in which
the context includes a state of the user, and the output control section determines the allocation on a basis of the state of the user that is recognized.

(10)

The information processor according to (9), in which the output control section determines the allocation on a basis of a recognized moving speed of the user.

(11)

The information processor according to any one of (8) to (10), in which the context includes a state of a surrounding environment, and the output control section determines the allocation on the basis of the state of the user that is recognized.

(12)

The information processor according to any one of (8) to (11), in which the output control section dynamically changes the allocation on a basis of the context.

(13)

The information processor according to any one of (1) to (12), in which the output control section determines the corresponding one of the output terminals and the allocation on a basis of the moving path, the corresponding one of the output terminals being caused to output the presentation information.

(14)

The information processor according to (13), in which the output control section dynamically changes the corresponding one of the output terminals and the allocation on a basis of the moving path, the corresponding one of the output terminals being caused to output the presentation information.

(15)

The information processor according to any one of (1) to (14), in which the output control section determines the allocation to cause a portion of the presentation information to be redundantly outputted by the plurality of output terminals.

(16)

The information processor according to (15), in which the output control section determines the allocation to cause a portion of the presentation information to be outputted as a voice or an image by corresponding two different output terminals of the output terminals.

(17)

The information processor according to any one of (1) to (16), further including a path calculation section that calculates the moving path.

(18)

The information processor according to any one of (1) to (17), further including a recognition section that recognizes the state of the user or the state of the surrounding environment.

(19)

An information processing method, including controlling, by a processor, an output of presentation information, the output being performed by a plurality of output terminals, the controlling further including determining an allocation of the presentation information on a basis of a moving path of a user, the presentation information being caused to be outputted by corresponding one of the plurality of output terminals.

(20)

A program that causes a computer to function as an information processor, the information processor including an output control section that controls an output of presentation information, the output being performed by a plurality of output terminals, and the output control section determining an allocation of the presentation information on a basis of a moving path of a user, the presentation information being caused to be outputted by corresponding one of the plurality of output terminals.

REFERENCE NUMERALS LIST 10 information processing terminal
110 output section
120 voice input section
130 imaging section
140 sensor section
150 server communication section
20 information processor
210 recognition section
220 path calculation section
230 output control section
240 voice synthesizing section
250 storage section
260 terminal communication section

The invention claimed is:

1. An information processor comprising:
circuitry configured to implement an output control section that controls an output of presentation information, the output being performed by a plurality of output terminals,
the output control section calculating a moving path of a user on a basis of a destination explicitly input by the user, determining an allocation of the presentation information on a basis of the moving path of the user, the presentation information being caused to be outputted by corresponding one of the plurality of output terminals.

2. The information processor according to claim 1, wherein the output control section determines the allocation on a basis of an output characteristic of each of the output terminals.

3. The information processor according to claim 2, wherein
the output characteristic includes an information type that is outputtable by each of the output terminals, and
the output control section determines the allocation on a basis of the information type.

4. The information processor according to claim 3, wherein
the information type includes at least audio information and visual information, and
the output control section allocates, as a voice, at least a portion of the presentation information to the corresponding one of the output terminals configured to output the audio information, and allocates, as an image, at least a portion of the presentation information to the corresponding one of the output terminals configured to output the visual information.

5. The information processor according to claim 2, wherein
the output characteristic includes an outputtable information quantity that is outputtable by each of the output terminals, and
the output control section determines the allocation on a basis of the outputtable information quantity.

6. The information processor according to claim 5, wherein the output control section calculates the outputtable information quantity on a basis of a size of a display section included in each of the output terminals.

7. The information processor according to claim 5, wherein the output control section calculates the outputtable information quantity on a basis of a maximum volume that is outputtable by each of the output terminals.

8. The information processor according to claim 1, wherein the output control section determines the allocation on a basis of a context related to the output of the presentation information.

9. The information processor according to claim 8, wherein
the context includes a state of the user, and
the output control section determines the allocation on a basis of the state of the user that is recognized.

10. The information processor according to claim 9, wherein the output control section determines the allocation on a basis of a recognized moving speed of the user.

11. The information processor according to claim 8, wherein
the context includes a state of a surrounding environment, and
the output control section determines the allocation on a basis of a state of the user that is recognized.

12. The information processor according to claim 8, wherein the output control section dynamically changes the allocation on a basis of the context.

13. The information processor according to claim 1, wherein the output control section determines the corresponding one of the output terminals and the allocation on a basis of the moving path, the corresponding one of the output terminals being caused to output the presentation information.

14. The information processor according to claim 13, wherein the output control section dynamically changes the corresponding one of the output terminals and the allocation on a basis of the moving path, the corresponding one of the output terminals being caused to output the presentation information.

15. The information processor according to claim 1, wherein the output control section determines the allocation to cause a portion of the presentation information to be redundantly outputted by the plurality of output terminals.

16. The information processor according to claim 15, wherein the output control section determines the allocation to cause a portion of the presentation information to be outputted as a voice or an image by corresponding two different output terminals of the output terminals.

17. The information processor according to claim 1, wherein the circuitry is further configured to implement a path calculation section that calculates the moving path.

18. The information processor according to claim 1, wherein the circuitry is further configured to implement a recognition section that recognizes a state of the user or a state of a surrounding environment.

19. An information processing method, comprising controlling, by a processor, an output of presentation information, the output being performed by a plurality of output terminals,
the controlling further including calculating a moving path of a user on a basis of a destination explicitly input by the user, determining an allocation of the presentation information on a basis of the moving path of the user, the presentation information being caused to be outputted by corresponding one of the plurality of output terminals.

20. A non-transitory, computer-readable medium storing a program that, when executed on a computer, causes the computer to function as an information processor, the information processor comprising an output control section that controls an output of presentation information, the output being performed by a plurality of output terminals, and the output control section calculating a moving path of a user on a basis of a destination explicitly input by the user, determining an allocation of the presentation information on a basis of the moving path of the user, the presentation information being caused to be outputted by corresponding one of the plurality of output terminals.

* * * * *